(12) United States Patent
Giannetti

(10) Patent No.: US 8,904,280 B2
(45) Date of Patent: Dec. 2, 2014

(54) RECURSIVE FLOWS IN VARIABLE-DATA PRINTING DOCUMENT TEMPLATES

(75) Inventor: Fabio Giannetti, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2714 days.

(21) Appl. No.: 11/412,795

(22) Filed: Apr. 28, 2006

(65) Prior Publication Data

US 2007/0276856 A1 Nov. 29, 2007

(30) Foreign Application Priority Data

Apr. 30, 2005 (GB) .................................. 0508949.5

(51) Int. Cl.
*G06F 17/24* (2006.01)
*G06F 17/21* (2006.01)
*G06F 17/30* (2006.01)

(52) U.S. Cl.
CPC ............ *G06F 17/243* (2013.01); *G06F 17/217* (2013.01)
USPC ........... 715/243; 715/234; 715/246; 715/247; 715/253

(58) Field of Classification Search
CPC .................................................... G06F 17/217
USPC .................. 715/234, 246, 247, 856
See application file for complete search history.

(56) References Cited

U.S. PATENT DOCUMENTS

| | | | | |
|---|---|---|---|---|
| 5,381,523 A | * | 1/1995 | Hayashi | 715/204 |
| 7,200,816 B2 | * | 4/2007 | Falk et al. | 715/762 |
| 7,278,094 B1 | * | 10/2007 | Dreyer et al. | 715/234 |
| 2004/0107118 A1 | * | 6/2004 | Harnsberger et al. | 705/2 |

FOREIGN PATENT DOCUMENTS

GB    2336012 A    10/1998

OTHER PUBLICATIONS

"Personalized Print Markup Language: The PPML Family of XML Standards", publisher: PODi, published: Jul. 2003, pp. 1-8.*
Giannetti, "FOA and XSL-FO Authoring Tool", publisher: Hewlett Packard, published: 2001, p. 1-11.*

* cited by examiner

*Primary Examiner* — Stephen Hong
*Assistant Examiner* — Wilson Tsui

(57) ABSTRACT

A method, system and a computer program product for generating, rendering and printing documents 100,110,120 from a variable-data printing document template 130 which defines a document defining a layout of nested document portions 150 comprising content which is variable in response to input data 140. There is provided a way of expressing and treating nested flows, thus enabling the creation of complex document designs for Variable Data Publishing material used in Digital Publishing.

21 Claims, 4 Drawing Sheets

RECURSIVE FLOWS IN VARIABLE-DATA PRINTING DOCUMENT TEMPLATES

RELATED APPLICATION

The present application is based on, and claims priority from, UK Application Number 0508949.5, filed Apr. 30, 2005, the disclosure of which is hereby incorporated by reference herein in its entirety.

FIELD OF THE INVENTION

This invention relates to a method, system and a computer program product for generating, rendering and printing a document, and to a variable-data printing document template which defines a document containing variable content in response to input data.

RELATED ART

The advent of digital technology means there are now more ways than ever to communicate. This increased ability to send and receive data significantly expands an organization's ability to deliver information via the Internet and advanced printing and publishing systems.

The combination of Web technologies and digital printing can reduce communication costs, help businesses acquire new customers, increase the loyalty and buying habits of current customers, enable new revenue opportunities, and give birth to new business models.

By gathering the right data and utilizing digital publishing an organization can deliver information customized to their customer's wishes, when they need it. Consequently, it is no surprise that personalized, highly targeted collateral and direct marketing are widely accepted as key factors in achieving higher response rates, increased efficiencies, and improved marketing.

Digital publishing solutions enable real-time targeted marketing (RTTM) by enabling the ability to create, print on demand, and distribute marketing collateral such as brochures, presentations, direct mail and point of sale materials that are customized to each audience member in a cost effective manner. However, the value of RTTM extends beyond improved marketing response rates by helping reduce costs and drive incremental revenue.

Variable-data printing (VDP) is a form of on-demand printing in which all the documents in a print run are similar but not identical. A mail merge is a simple form of variable-data printing. For example, personalized letters may have the same basic layout, but there will be different a name and address on each letter.

However, VDP can now go far beyond printing different names and addresses on a document. There are systems that enable the user to insert different graphics into a document, change the layout and/or the number of pages, print a unique bar code on each document and more.

A prominent example of VDP usage is how credit-card companies analyze the buying histories of their customers and send information about specific products and services related to the ascertained customer interests. VDP systems are used to print these customized advertisements.

The concept of creating variable-data documents has also been extended to non-paper documents such as PDF documents and HTML documents. The term variable-data publishing (VDP) encompasses both paper documents and on-line documents.

A number of different technologies and formats have emerged which assist in the implementation of VDP systems, and these are discussed briefly below.

Scalable Vector Graphic (SVG) is a new graphics file format and Web development language based on Extensible Markup Language (XML). SVG enables designers to create dynamically generated, high-quality graphics from real-time data with precise structural and visual control. With this technology, SVG developers can create applications and documents based on data-driven, interactive, and personalized graphics.

Extensible Markup Language (XML) is a markup language much like HyperText Markup Language (HTML). XML and HTML were designed with different goals. XML was created to structure, store and to send information. Since XML is a cross-platform, software and hardware independent tool for transmitting information, XML data can be exchanged between incompatible systems. In practice, computer systems and databases may contain data in incompatible formats. Converting the data to XML creates data that can be read by many different types of applications, and this greatly reduces this complexity of exchanging data between systems.

Extensible Stylesheet Language Formatting Objects (XSL-FO) is an XML based markup language describing the formatting of XML data for output to screen paper or other media.

The above developments have enabled the production of increasingly sophisticated VDP material for Digital Publishing. Production of such material relies upon the creation of complex document designs that have sections with variable content known as flows. This variable content is, for example, to be obtained from a database, and may occupy a variable size as well as having variable content. The physical location of a document set aside for such a flow (of variable data) is often termed a 'copyhole'.

Complex document designs can have nested flows where an inner flow is positioned in the page within a main flow. In case of VDP, this creates a further level of complexity since both the flows, main and inner, may contain variable data which causes their overall size to be variable.

Typically, a nested flow has its own layout. In some cases, it is desirable that the layout is preserved when it is merged inside the main flow. It may also be preferable that the absolute positioning of the nested flow is maintained, while the relative position inside the main flow is adjusted.

Currently, only proprietary tools are capable of expressing flows but they render the document in real time. In other words, they incorporate the content when the document layout is being designed, thus defining a final document before it is exported. Consequently, application of these proprietary tools in conjunction with variable data merging is not viable.

SUMMARY OF THE INVENTION

According to a first aspect of the invention, there is provided a method of rendering a variable-data printing document template, the template defining a document containing at least one nested flow within a main flow, each flow defining variable content in response to input data, the method comprising:
 rendering a main flow by a rendering engine to produce a document representation;
 when the rendering engine reaches a point of the main flow where a nested flow is indicated, rendering the nested flow; and after the flows are rendered, using the rendering engine to re-compose the document representations to produce a document file.

According to a second aspect of the invention, there is provided a method of generating a variable-data printing document template, the template defining a document to contain variable content in response to input data, the method comprising:

defining a template comprising a layout of document portions, at least one of the document portions comprising a main flow, having an Extensible Markup Language (XML) based description, that contains content which is variable in response to the input data; and defining a nested-flow within said main flow and comprising a further document portion containing further content which is variable in response to the input data, wherein a document is for generation from the template in response to input data which defines the document content and the template is in computer readable format.

The relative position of a nested flow inside a main flow may be variable in response to input data. Accordingly, the layout of the nested flow may be preserved when it is merged inside a main flow.

In order to preserve the layout of the nested flow, and enable the main flow to position it according to the input data without any alteration, the nested flow may be represented as a combination of an Extensible Stylesheet Language Formatting Object (XSL-FO) and a Scalable Vector Graphic (SVG).

Since Extensible Markup Language (XML) is a cross-platform, software and hardware independent tool for transmitting information, the input data may be represented as XML so that it can be exchanged between incompatible systems. Accordingly, use of XML data may greatly reduce the complexity of exchanging data between systems.

According to a third aspect of the invention, there is provided a method of generating a document for printing, the document being derived from a variable-data printing document template which defines a document to contain variable content in response to input data, the method comprising:

generating the document template, by;

defining a template comprising a layout of document portions, at least one of the document portions comprising a main flow that contains content which is variable in response to the input data; and defining a nested-flow within said main flow and comprising a further document portion containing further content which is variable in response to the input data; and generating a document for printing by providing input data to the template which defines the document content.

According to a fourth aspect of the invention, there is provided a method of printing a document, the method comprising:

receiving a variable-data printing document template in computer readable format defining a document to contain variable content in response to input data, the template comprising a layout of document portions, at least one of the document portions comprising a main flow that contains content which is variable in response to the input data, the template further comprising a nested flow within said main and comprising a further document portion containing further content which is variable in response to the input data;

generating a document for printing by providing input data to the template which defines the document content; and printing the document.

According to a fifth aspect of the invention, there is provided A system for generating a variable-data printing document template, the template defining a document containing variable content in response to input data, the template comprising a layout of document portions, the system comprising:

a processor which is adapted to receive from a user a variable-data printing document template in computer readable format defining a document to contain variable content in response to input data, the template comprising a layout of document portions, at least one of the document portions comprising a main flow that contains content which is variable in response to the input data, the template further comprising a nested flow within said main and comprising a further document portion containing further content which is variable in response to the input data; and provide to a printer the document template.

The system may further comprise a printer adapted to receive input data which defines the document content, and generate a document version from the input data and the variable-data printing document template.

According to a sixth aspect of the invention there is provided a computer program for implementing a method of generating a variable-data printing document template, the program adapted to carry out the steps of:

receiving user definitions defining a layout of document portions, at least one of the document portions comprising a main flow that contains content which is variable in response to the input data, and further comprising a nested flow within the main flow and comprising a further document portion containing further content which is variable in response to the input data; and generating a computer readable variable data printing document template in response to the user definitions.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Examples of the invention provide a method, system and a computer program product for generating, rendering and printing a document, the document comprising a variable-data printing document template which defines a document containing variable content in response to input data. Accordingly, the invention enables production of variable-data publishing (VDP) material for Digital Publishing (DP) that rely upon complex document designs containing sections with variable content. Such document sections which contain variable content are hereby referred to as flows.

Figure 1:
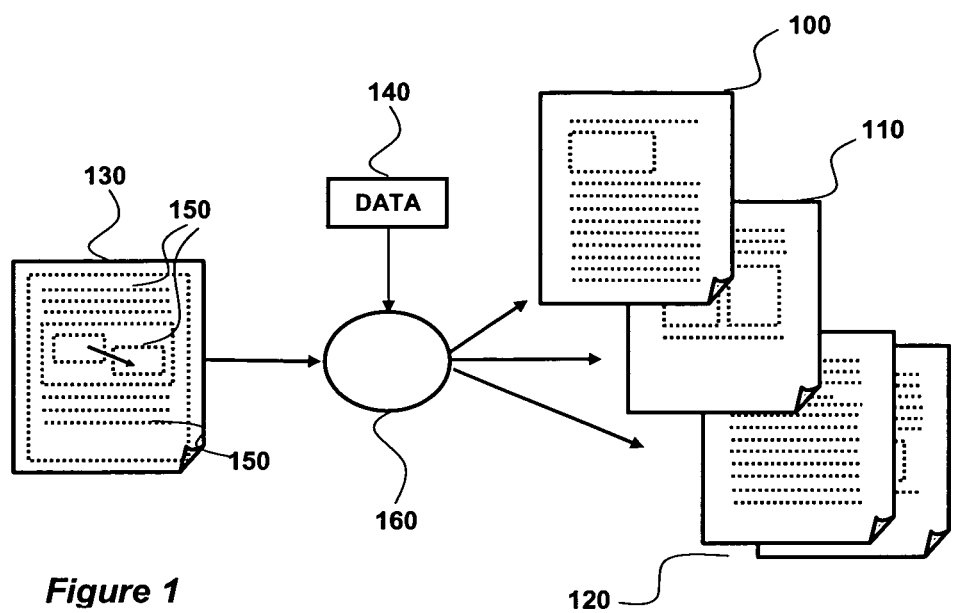
FIG. 1 shows the process of generating documents for printing, the document comprising a template which defines a document containing variable content in response to input data.

Referring to FIG. 1, the process of generating documents 100,110,120 for printing from a document template 130 which defines a document containing variable content in response to input data 140 is shown. The document template 130 comprises a layout of document portions 150 containing content which is variable in response to the input data 140.

The document template 130 is passed to a processor 160 to be merged with input data 140. The input data 140 may be a form of collated data such as, purely by way of an example, a table, a database or a spreadsheet, which defines content to be merged into the document portions 150 of the document template 130 by the processor 160. The processor 160 merges data 140 with the document template 130 and renders the result to produce a document 100 comprising content in response to the data 140. The document can then be rasterised for printing on a printer or digital press.

The input data can be represented using Extensible Markup Language (XML). Since XML is a cross-platform, software and hardware independent tool for transmitting information, data represented as XML can be exchanged between incompatible systems. Accordingly, use of XML can greatly reduce the complexity of exchanging the data 140.

From a single document template 130, the processor 160 is able to merge the input data 140 to create a plurality of documents 100,110,120 which all contain unique layouts and content.

Figure 2:
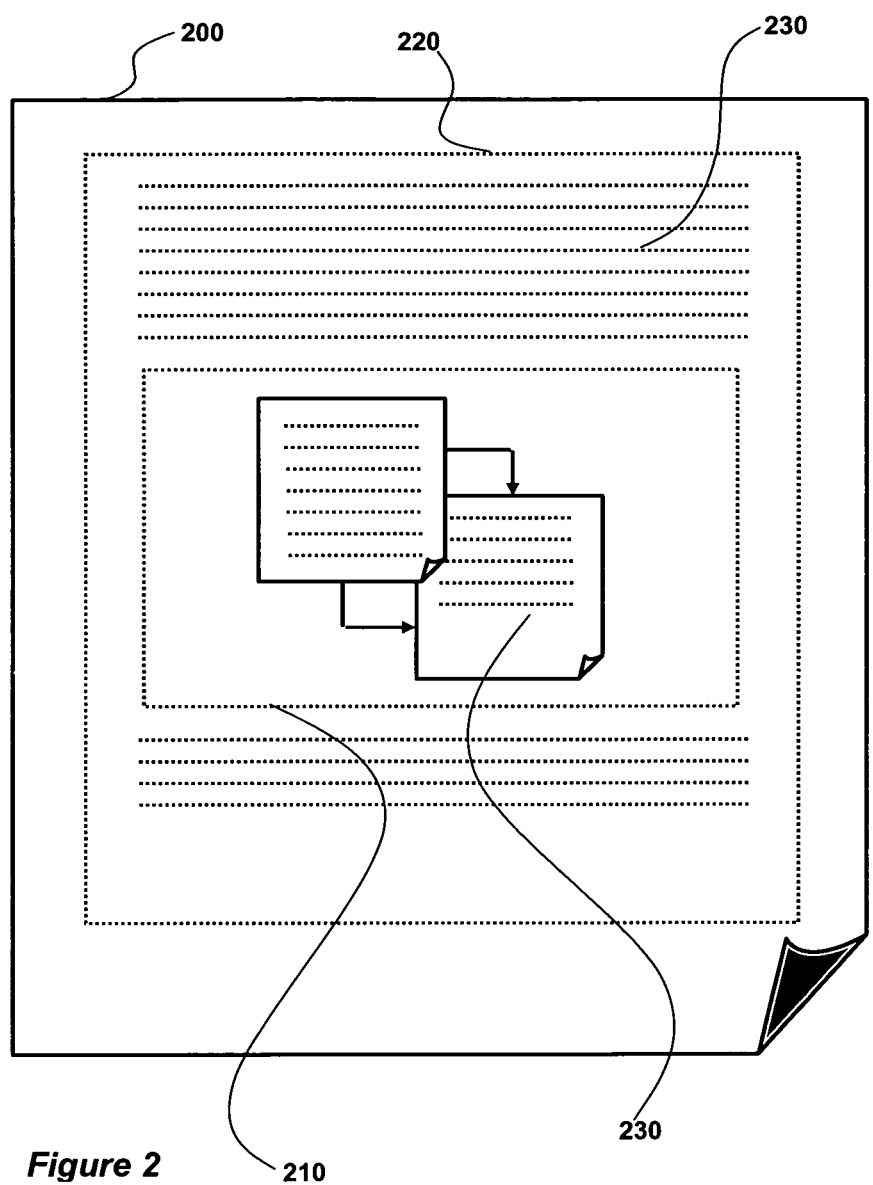
FIG. 2 shows the concept of a flow and a nested flow within a document template.

Referring to FIG. 2, complex document designs can consist of a document template 200 comprising a nested flow 210. A nested flow 210 is a document portion which is positioned within another flow 220, hereby referred to as a main flow 220. In the case of VDP, this creates a further level of complexity since both the flows, main 220 and nested 210, can contain variable content 230 causing their overall size to also be variable.

Typically, a nested flow 210 has its own layout. In some cases, it is desirable that the layout is preserved when it is merged inside the main flow 220. It may also be preferable that the absolute positioning of the nested flow 210 (on the page) is maintained, while the relative position inside the main flow 220 is adjusted.

Currently, there do not exist any XML based formats that are currently capable of expressing or supporting multiple flows without requiring additional extension. Using XSL-FO with embedded SVG only provides the possibility of having a single flow. Furthermore, SVG itself has a very limited capability of flow and does not span across SVG documents or SVG groups.

In one example of the invention, two existing XML based formats, Extensible Stylesheet Language Formatting Objects (XSL-FO) and Scalable Vector Graphics (SVG), are combined to obtain the above-mentioned layout preservation ability. The main flow 220 is represented as a standard XSL-FO document so that it can span on multiple pages and follow a pagination model. The nested flow 210 is instead represented as a combination of SVG and XSL-FO.

Figure 3:
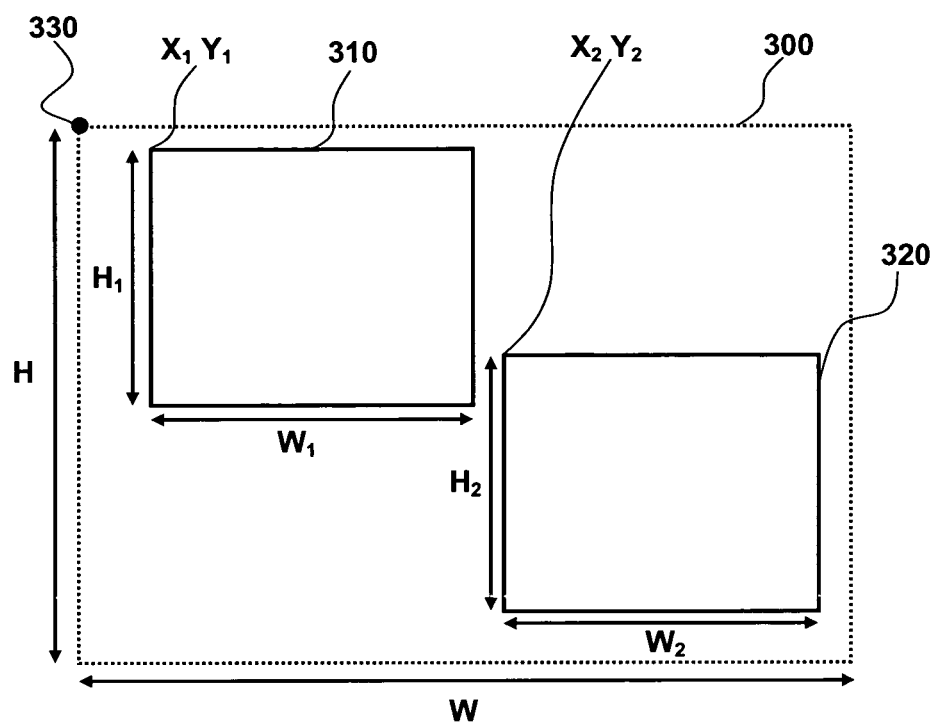
FIG. 3 shows the concept of a nested flow as a structured document representation containing nested variable content.

Referring to FIG. 3, the concept of a nested flow 300 as a structured document representation containing nested variable content 310,320 is shown. The structure of the nested flow 300 is represented as an absolute positioned set of copyholes that match the pagination format in XSL-FO, this preserves the nested flow 300 layout enabling a main flow to position it according to variable data without any alteration.

For illustration of how the nested flow is represented as a structured SVG, a number of attributes of the nested flow 300 are defined. The nested flow 300 has a height H, a width W and coordinate system such that the origin X=0, Y=0 is located at the upper left corner 330 of the nested flow 300. Variable content 310 has a height $H_1$, a width $W_1$ and is located within the nested flow 300 such that its upper left corner has the coordinates $X_1,Y_1$. Variable content 320 has a height $H_2$, a width $W_2$ and is located within the nested flow 300 such that its upper left corner has the coordinates $X_2,Y_2$.

The structured SVG representation of the nested flow 300 with variable content 310, 320 contained inside a group element of the SVG is then expressed as follows:

```
<fo:instream-foreign-object content-type="image/structured-svg">
    <svg width="W" height="H">
        <g translate="X1 Y1" id="ID1">
            'foreign object document code'
        </g>
        <g translate="X2 Y2" id="ID2">
            (empty)
        </g>
    </svg>
</fo:instream-foreign-object>
```

This code is simply representing the nested flow 300 by defining its attributes within the tags of the code. The first line of code describes the root element, here it is the nested flow 300, as being a foreign object containing a structured SVG. In the first line, the definition "structured-SVG" is a new type of SVG document. The next eight lines describe the child elements of the root which are the sections of variable content 310,320. The line "foreign object document code" defines the inner flow, and this code is expanded below, but is standard SVG code.

Line 2 of the code defines the SVG representation of the nested flow 300 as having a width W and a height H. Lines 3 to 5 describe the location of first section of variable content 310 using $X_1$ and $Y_1$, identify it as "ID1" and define its content using foreign object document code. Lines 6 to 8 describe the location of second section of variable content 320 using $X_2$ and $Y_2$, identify it as "ID2" and define it as not containing any content.

To provide a further example of the variable content 310, 320 embedded in the first group of the structured SVG representation of the nested flow 300, the "foreign object document code" can be expressed in additional detail as follows:

```
<fo:root>
    <fo:layout-master-set>
        <fo:simple-page-master page-width="W1"
        page-height="H1" master-name="ID1">
            <fo:region-body/>
        </fo:simple-page-master>
        <fo:simple-page-master page-width="W2"
        page-height="H2" master-name="ID2">
            <fo:region-body/>
        </fo:simple-page-master>
        <fo:page-sequence-master master-name="Flow1-1">
            <fo:single-page-master-reference
            master-reference="ID1"/>
            <fo:single-page-master-reference
            master-reference="ID2"/>
        </fo:page-sequence-master>
    </fo:layout-master-set>
    <fo:page-sequence master-reference="Flow1-1">
        <fo:flow flow-name="xsl-region-body">
            'content'
        </fo:flow>
    </fo:page-sequence>
</fo:root>
```

The code is simply defining the foreign object contained in the nested flow 300 using the attributes of the variable content sections 310,320. As a result, the nested flow 300 is represented as a structured SVG object within a main flow. This solution supports the presence of a further flow nested within the nested flow 300, for example by defining the content as a further foreign object. Consequently, the solution supports an indefinite number of nesting levels while still resulting in a SVG that is well structured and suitable for rendering.

The program code uses standard SVG tags as defined by the World Wide Web Consortium (W3C). These will be well known to those skilled in the art and accordingly are not described in detail.

Figure 4:
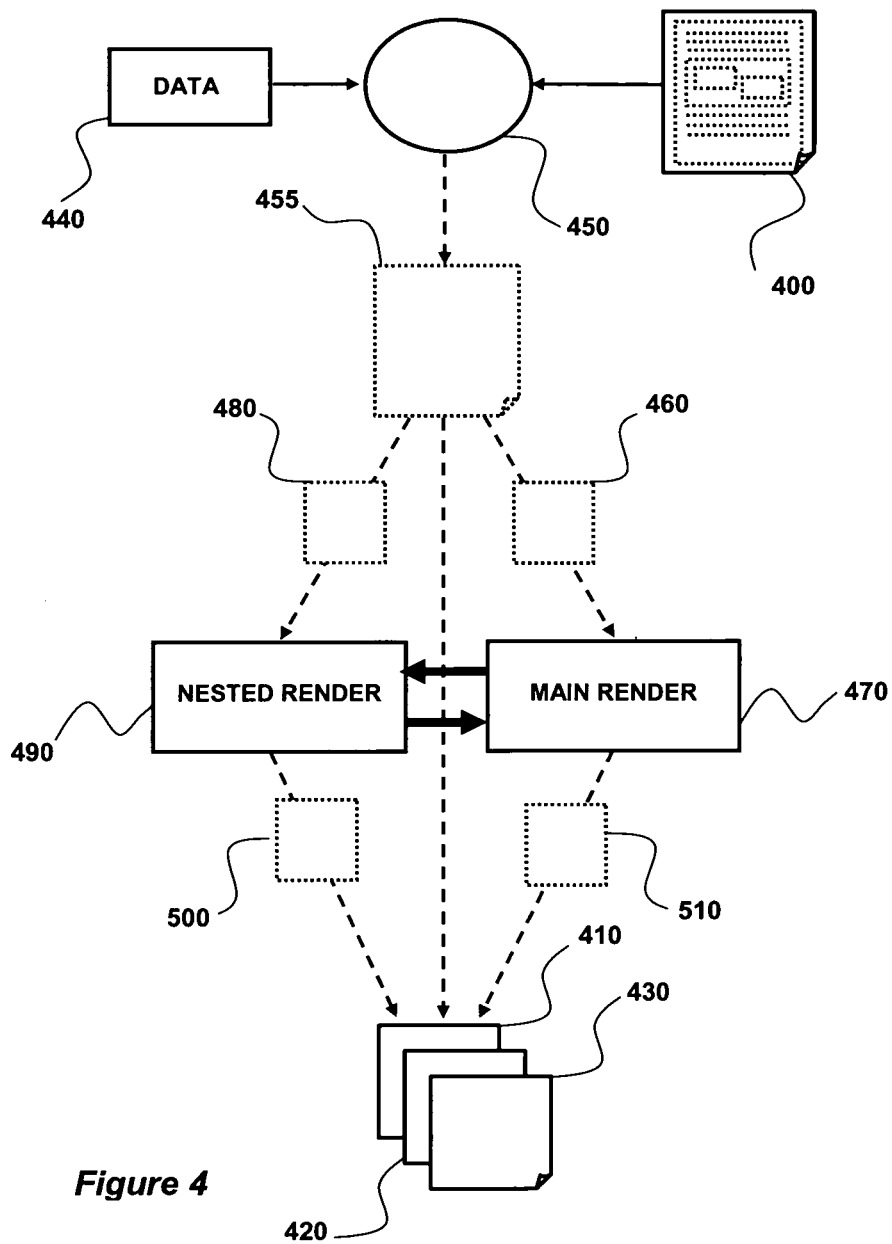
FIG. 4 shows the process of rendering a document template, which contains nested flows, to produce a document with content in response to input data.

A process of merging and rendering a structured document template 400, which contains nested flows, to produce rendered documents 410,420,430 with content in response to input data 440 is shown in FIG. 4.

The document template passed to a processor 450 to be merged with input data 440. The input data 440 may be a form of collated data such as, purely by way of an example, a table, a database or a spreadsheet, which defines content to be merged into the document portions of the document template 400 by the processor 450. The processor 450 merges data 440 with the document template 400 to produce a structured merged document 455 comprising content in response to the data 440.

A main flow 460 of the structured merged document 455 is passed to the main rendering processor 470 to be rendered. When the main rendering processor 470 reaches a point in the main flow 460 that indicates the presence of a nested flow 480, the nested flow 480 is passed to the nested rendering processor 490 to be rendered.

The nested rendering process will produce a paginated document representation 500, the paginated document representation 500 simply being a document representation with sub-documents identifying the pages.

Once the main flow 460 is rendered into a paginated document representation 510, the overall result will be a collection of document representations 500,510. The document representations 500,510 will have a hierarchy that can be seen as a collection of document representations, each with different complexity and nesting.

After the rendering of the flows is performed, the document representations are re-composed using the structured merged document 455 to create a rendered document 410, comprising content in response to the data 440, by simply matching the IDs of the rendered document representations 500,510 with the IDs is of the structured document template 400.

From a single structured document template 400, the process can merge the data 440 and render the flows 450,460 to create a plurality of rendered documents 410,420,430 all of which contain unique layouts and content.

Inclusion of separate rendering processors 470,490 enables the rendering processors 470,490 to complete their tasks in parallel. The combination of flows and structured document representations allows the execution of parallel rendering, since the main flow has the overall size information of the nested flow and can continue rendering without waiting for the nested render to complete. This is very important in a production environment like in DP, where the digital presses need to be run at full speed.

In one example of the invention, the rendered document representations are Scalable Vector Graphics (SVG). In this case, when the rendering has been completed, the final structured SVG representation of the nested flow 300 with variable content 310, 320 contained inside a group element of the SVG is then expressed as follows:

```
<svg width="W" height="H">
    <g translate="X1 Y1" id="ID1">
        <svg width="W1" height="H1">
            rendered content for section/page 1
        </svg>
    </g>
    <g translate="X2 Y2" id="ID2">
        <svg width="W2" height="H2">
            rendered content for section/page 2
        </svg>
    </g>
</svg>
```

Although a plurality of rendering processors has been described, there may be provided only a single rendering processor which becomes recursive and performs multiple and independent flow renderings.

The rendered document can then be rasterised for printing on a printer or digital press. The rasterisation process examines the document and creates a resterised image to tell the printer what content is where and how it should be printed. This is repeated for every single page of the document. Since high-volume print jobs can easily contain tens of thousands of pages that all have to be rasterised, it is important to optimize the speed at which the rasterisation process can be completed.

Some digital presses currently use technology that accelerates the rasterisation of certain document content such as text. The way in which the documents are composed by the invention, using the structured and paginated approaches, is beneficial for the rasterisation process inside digital presses since they can be easily decomposed into small pieces of specific content and processed more quickly by the opitmised technology. If the document representation is constructed in a non-structural way, this task can be difficult or even impossible.

The invention can be implemented as a GA tool to represent documents composed by computer based design software such as Quark xPress and Adobe InDesign. Further modification may also enable the invention to be incorporated into existing VDP software and systems.

Those skilled in the art will realise that the above embodiments are purely by way of example and that modifications and alterations are numerous and may be made while retaining the teachings of the invention.

The invention claimed is:

1. A method of generating a variable-data printing document template, the template defining a document to contain variable content in response to input data, the method comprising:
    defining a template comprising a layout of document portions, at least one of the document portions comprising a main flow, having an Extensible Markup Language (XML) based description, that contains content which is variable in response to the input data; and
    defining a nested-flow within said main flow and comprising a further document portion containing further content which is variable in response to the input data,
    wherein a document is for generation from the template in response to input data which defines the document content and the template is in computer readable format.

2. A method according to claim 1 wherein the layout of a nested flow is maintained, while its relative position inside the main flow is variable in response to the input data.

3. A method according to claim 1 wherein the main flow is represented as an Extensible Stylesheet Language Formatting Object (XSL-FO).

4. A method according to claim 1 wherein the nested flow is represented as a combination of an Extensible Stylesheet Language Formatting Object (XSL-FO) and a Scalable Vector Graphic (SVG).

5. A method according to claim 1 wherein the input data is represented as Extensible Markup Language (XML).

6. A method of generating a document for printing, the document being derived from a variable-data printing document template which defines a document to contain variable content in response to input data, the method comprising:
   generating the document template, by;
      defining a template comprising a layout of document portions, at least one of the document portions comprising a main flow that contains content which is variable in response to the input data; and
      defining a nested-flow within said main flow and comprising a further document portion containing further content which is variable in response to the input data; and
   generating a document for printing by providing input data to the template which defines the document content.

7. A method according to claim 6 wherein the layout of a nested flow is maintained, while its relative position inside the main flow is variable in response to input data.

8. A method according to claim 6 wherein the main flow is represented as an Extensible Stylesheet Language Formatting Object (XSL-FO).

9. A method according to claim 6 wherein the nested flow is represented as a combination of an Extensible Stylesheet Language Formatting Object (XSL-FO) and a Scalable Vector Graphic (SVG).

10. A method according to claim 6 wherein the input data is represented as Extensible Markup Language (XML).

11. A method according to claim 6 wherein the document is a paginated document representation.

12. A method according to claim 6 wherein the document representation is a Scalable Vector Graphic (SVG).

13. A method of printing a document, the method comprising:
   receiving a variable-data printing document template in computer readable format defining a document to contain variable content in response to input data, the template comprising a layout of document portions, at least one of the document portions comprising a main flow that contains content which is variable in response to the input data, the template further comprising a nested flow within said main flow and comprising a further document portion containing further content which is variable in response to the input data;
   generating a document for printing by providing input data to the template which defines the document content; and
   printing the document.

14. A method according to claim 13 wherein the main flow is represented as an Extensible Stylesheet Language Formatting Object (XSL-FO).

15. A method according to claim 13 wherein the nested flow is represented as a combination of an Extensible Stylesheet Language Formatting Object (XSL-FO) and a Scalable Vector Graphic (SVG).

16. A method according to any of claim 13 wherein the input data is represented as Extensible Markup Language (XML).

17. A system for generating a variable-data printing document template, the template defining a document containing variable content in response to input data, the template comprising a layout of document portions, the system comprising:
   a computer processor which is adapted to:
      receive from a user a variable-data printing document template in computer readable format defining a document to contain variable content in response to input data, the template comprising a layout of document portions, at least one of the document portions comprising a main flow that contains content which is variable in response to the input data, the template further comprising a nested flow within said main and comprising a further document portion containing further content which is variable in response to the input data; and
      provide to a printer the document template.

18. The system according to claim 17, further comprising a printer which is adapted to receive input data which defines the document content, and generate a document version from the input data and the variable-data printing document template.

19. A non-transitory computer readable medium or a non-transitory memory for implementing a method of generating a variable-data printing document template, the program adapted to carry out the steps of:
   receiving user definitions defining a layout of document portions, at least one of the document portions comprising a main flow that contains content which is variable in response to the input data, and further comprising a nested flow within the main flow and comprising a further document portion containing further content which is variable in response to the input data; and
   generating a computer readable variable data printing document template in response to the user definitions.

20. A non-transitory computer readable medium or a non-transitory memory according to claim 19 wherein in the computer readable variable data printing document template the main flow is represented as Extensible Stylesheet Language Formatting Object (XSL-FO) and the nested flow is represented as a combination of an Extensible Stylesheet Language Formatting Object (XSL-FO) and a Scalable Vector Graphic (SVG).

21. A non-transitory computer readable medium or non-transitory memory according to claim 19 further adapted to generate a document from the variable-data printing document template in response to input data which defines the document content.

* * * * *

UNITED STATES PATENT AND TRADEMARK OFFICE
CERTIFICATE OF CORRECTION

| | | |
|---|---|---|
| PATENT NO. | : 8,904,280 B2 | Page 1 of 1 |
| APPLICATION NO. | : 11/412795 | |
| DATED | : December 2, 2014 | |
| INVENTOR(S) | : Fabio Giannetti | |

It is certified that error appears in the above-identified patent and that said Letters Patent is hereby corrected as shown below:

In the Claims,

In column 10, line 5, in Claim 16, delete "any of claim" and insert -- claim --, therefor.

Signed and Sealed this
Nineteenth Day of May, 2015

Michelle K. Lee
*Director of the United States Patent and Trademark Office*